US008855831B2

(12) United States Patent
Son et al.

(10) Patent No.: US 8,855,831 B2
(45) Date of Patent: Oct. 7, 2014

(54) ENERGY CONTROL APPARATUS AND METHOD

(75) Inventors: Dong Min Son, Suwon (KR); Jae Seong Park, Daejeon (KR); Jung Hwan Oh, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 318 days.

(21) Appl. No.: 13/166,724

(22) Filed: Jun. 22, 2011

(65) Prior Publication Data

US 2012/0004785 A1 Jan. 5, 2012

(30) Foreign Application Priority Data

Jul. 2, 2010 (KR) .................. 10-2010-0064068

(51) Int. Cl.
*G06F 19/00* (2011.01)
*G01D 4/00* (2006.01)
*H02J 3/14* (2006.01)
*H02J 13/00* (2006.01)

(52) U.S. Cl.
CPC ... *H02J 3/14* (2013.01); *G01D 4/00* (2013.01); *H02J 2003/146* (2013.01); *Y04S 40/126* (2013.01); *H02J 13/0024* (2013.01); *Y02B 70/3225* (2013.01); *Y04S 20/224* (2013.01); *Y04S 20/222* (2013.01); *Y04S 20/327* (2013.01); *Y04S 20/242* (2013.01); *Y02B 90/2653* (2013.01); *Y04S 20/44* (2013.01); *H02J 13/0079* (2013.01); *H02J 13/0075* (2013.01); *Y04S 40/122* (2013.01); *H02J 2003/143* (2013.01); *Y02B 90/2623* (2013.01); *Y02B 70/3266* (2013.01); *Y02B 90/244* (2013.01)
USPC ..................... 700/295; 340/870.02

(58) Field of Classification Search
CPC ......... G01D 4/00; Y04S 41/126; Y04S 20/55; Y04S 20/222; Y04S 20/327; Y04S 20/242; Y04S 40/122; H02J 13/0075; H02J 13/0079; H02J 2003/143; H02J 2003/146; Y02B 70/3266; Y02B 90/2623

USPC ..................... 700/295; 340/870.02
See application file for complete search history.

(56) References Cited

U.S. PATENT DOCUMENTS 4,120,031 A * 10/1978 Kincheloe et al. ............ 705/412
(Continued)

FOREIGN PATENT DOCUMENTS

| CN | 101046863 | 10/2007 |
| JP | 2004-037284 | 2/2004 |

(Continued)

OTHER PUBLICATIONS

"How to set up a home web server", Jeff Goldin, Redhat.com, Aug. 22, 2006.*
The State Intellectual Property Office of the People's Republic of China Application Serial No. 201110192104.3, Office Action dated Apr. 23, 2013, 10 pages.

*Primary Examiner* — Michael D Masinick
(74) *Attorney, Agent, or Firm* — Lee, Hong, Degerman, Kang & Waimey

(57) ABSTRACT

According to the present disclosure, information on the amount of energy used is received from a meter in an energy consumption place and total rate of energy used in the energy consumption place using the received information. Further, when the calculated total rate of energy exceeds an upper limit set by a user in advance, a mobile terminal of the user is informed of it so as to enable the user to selectively control energy usage equipment in the energy consumption place. Since mobile terminals are carried by the user, when an energy usage rate exceeds an upper limit by an increased amount of energy used or energy price change, the user can identify it at anytime and anywhere. Further, the user can maintain the energy usage rate below a predetermined level by selectively controlling the energy usage equipment in the energy consumption place using the mobile terminal.

14 Claims, 14 Drawing Sheets

(56) References Cited

U.S. PATENT DOCUMENTS

| | | | |
|---|---|---|---|
| 6,734,806 B1 * | 5/2004 | Cratsley, III | 340/870.09 |
| 8,325,057 B2 * | 12/2012 | Salter | 340/870.02 |
| 2003/0193405 A1 * | 10/2003 | Hunt et al. | 340/870.02 |
| 2006/0020426 A1 * | 1/2006 | Singh | 702/188 |
| 2006/0103549 A1 * | 5/2006 | Hunt et al. | 340/870.02 |
| 2006/0106741 A1 * | 5/2006 | Janarthanan | 705/412 |

FOREIGN PATENT DOCUMENTS

| | | |
|---|---|---|
| JP | 2004-37284 | 2/2004 |
| JP | 2005-316843 | 11/2005 |
| JP | 2010-128810 | 6/2010 |

* cited by examiner

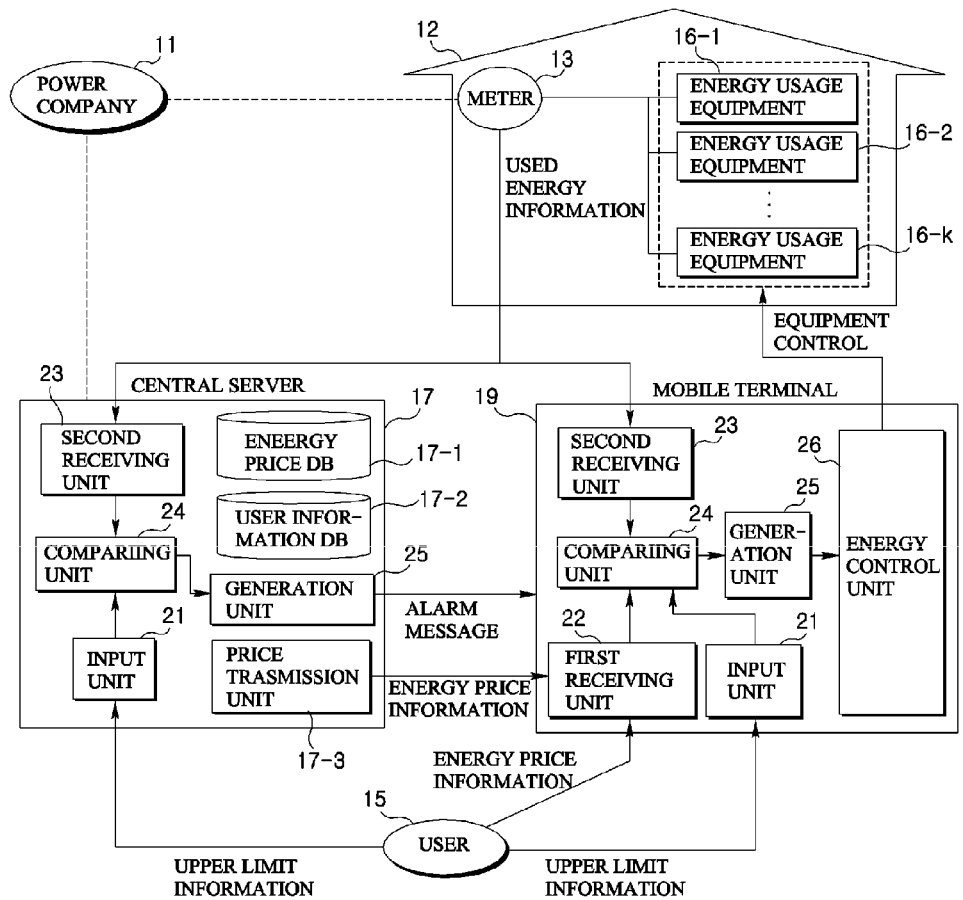

FIG. 5
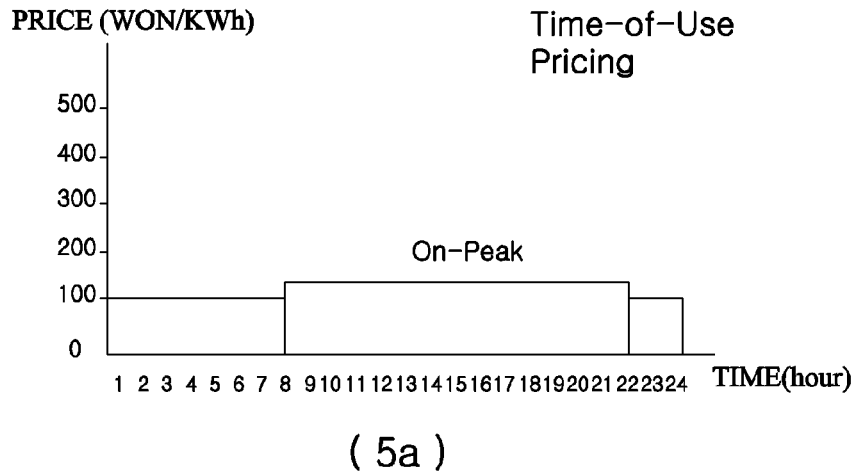
(5a)
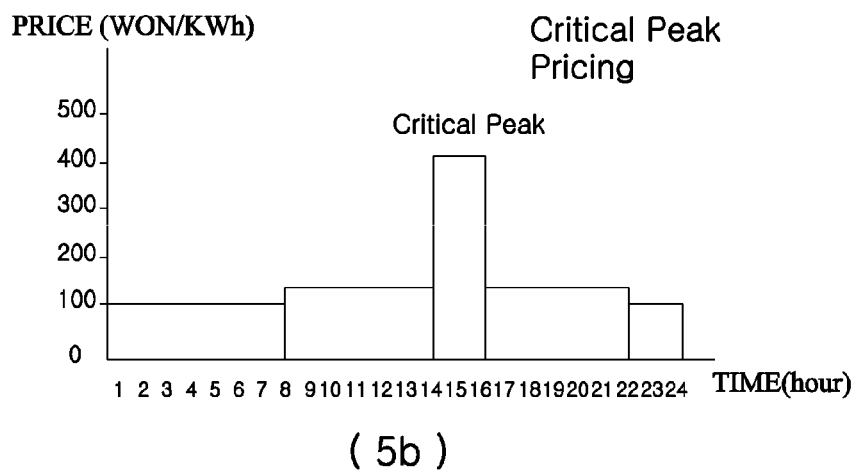
(5b)
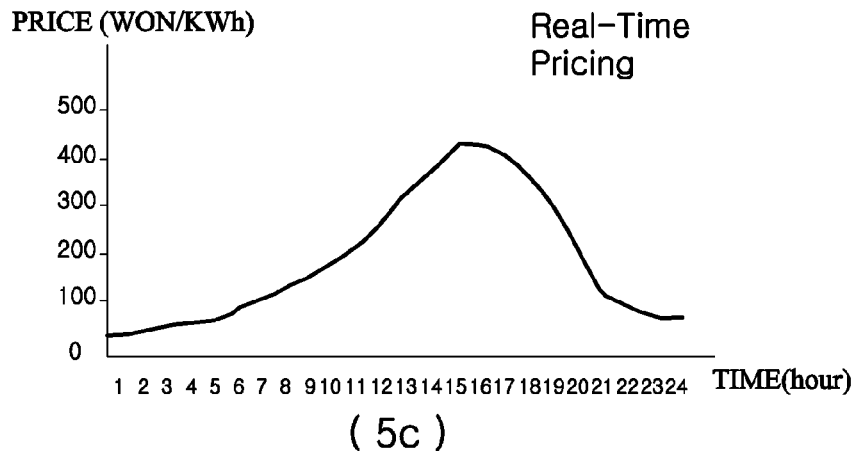
(5c)

FIG. 11
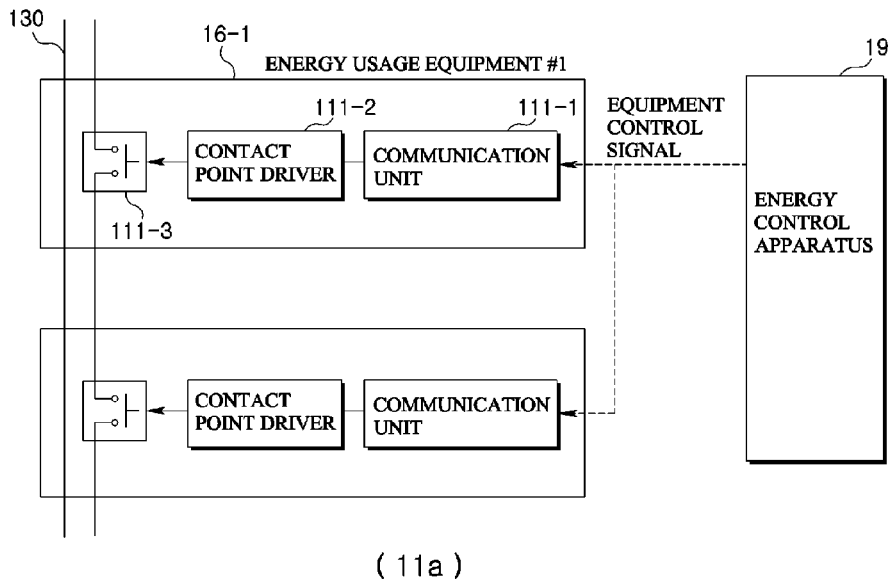
(11a)
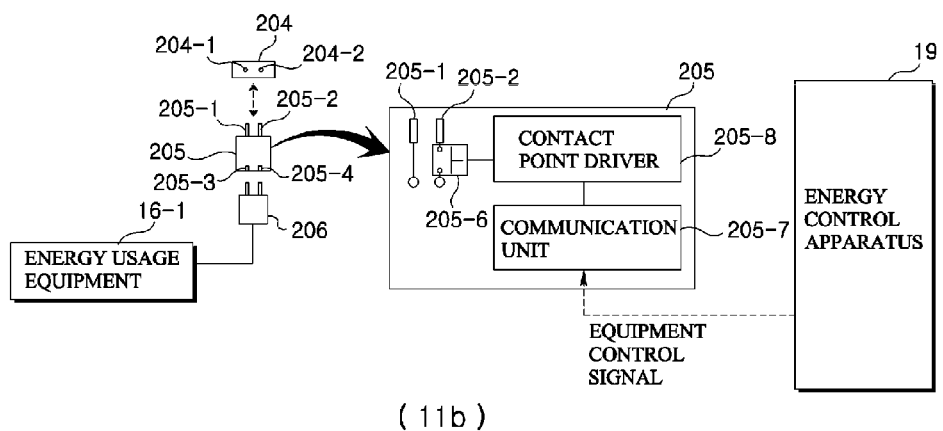
(11b)

ENERGY CONTROL APPARATUS AND METHOD

CROSS-REFERENCE TO RELATED APPLICATION

Pursuant to 35 U.S.C. §119 (a), this application claims the benefit of earlier filing date and right of priority to Korean Patent Application No. 10-2010-0064068, filed on Jul. 2, 2010, the contents of which are hereby incorporated by reference in their entirety.

BACKGROUND OF THE DISCLOSURE

1. Field of the Invention

The present disclosure relates to an energy control apparatus and method. More particularly, the present disclosure enables users to identify and control energy usage at energy consumption places such as home, office and company through mobile terminal, going long with the trend to use limited energy resources efficiently such as development of smart grid and smart meter technologies and implementation of energy price change system.

2. Description of the Related Art

Until now, energies such as electricity, gas and water supply have been provided depending on the maximum demand, and their prices also have been fixedly maintained.

Recently, however, as a method to use limited energy resources more efficiently and reduce energy consumption, a method is being taken in which prices of energy are differentiated by dividing them in time or season.

In connection with this, attention is becoming focused on a Smart Grid or a Smart Meter.

The smart grid is a next generation power network that can optimize energy efficiency and create a new added value by grafting an information technology (IT) onto a power network so that a power supplier and a consumer can exchange information each other in a real time manner.

Viewing the smart grid from the standpoint of an energy consumer, the energy consumer can use energy after finding the most reasonable time zone while the price of energy is changing.

The smart meter refers to a digital wattmeter having a communication function additionally, which can meter the amount of power usage in a real time and enable a power provider and a consumer to make an interactive communication therebetween. Therefore, it is possible to make a remoter meter reading though a meter men does not visit home, and the amount of power usage can be precisely measured due to a real time meter reading, whereby effects of saving metering cost and energy can be obtained.

Meanwhile, users who utilize energy should try to use energy more reasonably by controlling their energy usage actively departing from their conventional passive manner.

One method that users actively control their energy usage is to control energy usage equipment depending on an energy usage state.

Then, since the users cannot monitor the energy usage state of energy consumption places such as home, office and company, it is needed to develop a variety of methods with which users can monitor the energy usage state of energy consumption places with ease at anytime and anywhere and take steps correspondingly.

SUMMARY OF THE INVENTION

The present disclosure provides an energy control apparatus and method, capable of monitoring an energy usage state of a user and enabling a mobile terminal of the user to generate an alarm according to a result of the monitoring, whereby the user can take suitable steps.

According to an aspect of the present disclosure, there is provided an energy control apparatus using a mobile terminal of an energy user, including an input unit for enabling the mobile terminal to receive information on an upper limit of total rate of energy used during a certain period from the energy user; a first receiving unit for enabling the mobile terminal to receive energy price information from a central server; a second receiving unit for enabling the mobile terminal or the central server to receive information on the amount of energy used; a comparing unit for comparing the total rate of energy used during the certain period in the mobile terminal or the central server with the upper limit of the total rate of energy used input through the input unit; and a generation unit for enabling the mobile terminal to generate an alarm when the total rate of energy used during the certain period exceeds the upper limit of the total rate of energy used input through the input unit as a result of the comparison.

According to an embodiment of the present disclosure, the energy control apparatus may further include energy control unit to selectively control an operation of energy usage equipment using the mobile terminal According to an embodiment of the present disclosure, the energy may be any one of electricity, gas and water supply.

According to an embodiment of the present disclosure, the meter may be a smart meter.

According to an embodiment of the present disclosure, the energy control unit may display a list of the energy usage equipment so as to enable the user to select the energy usage equipment to be controlled.

According to an embodiment of the present disclosure, the energy control unit may display characteristic information such as energy efficiency or the amount of energy used of the energy usage equipment together with the list of the energy usage equipment in order to help the user to select the energy usage equipment to be controlled.

According to an embodiment of the present disclosure, the energy usage equipment may be electrical equipment, and the energy control unit may directly transmit an equipment control signal to control the energy usage equipment to the energy usage equipment or to an equipment controller to integrally control the energy usage equipment.

According to another aspect of the present disclosure, there is provided an energy control method using a mobile terminal of an energy user, including enabling the mobile terminal to receive information on an upper limit of total rate of energy used during a certain period from the energy user at an input step; enabling the mobile terminal to receive energy price information from a central server at a first receiving step; enabling the mobile terminal or the central server to receive information on the amount of energy used from a meter at a second receiving step; enabling the mobile terminal or the central server to compare the total rate of energy used during the certain period with the upper limit of the total rate of energy used input at the input step; and enabling the mobile terminal to generate an alarm when the total rate of energy used during the certain period exceeds the upper limit of the total rate of energy used input at the input step as a result of the comparison.

According to an embodiment of the present disclosure, the energy control method may further include selectively controlling an operation of energy usage equipment using the mobile terminal According to an embodiment of the present disclosure, the list of the energy usage equipment may be displayed so that the user can select energy usage equipment to be controlled at the energy controlling step.

According to an embodiment of the present disclosure, characteristic information of the energy usage equipment such as energy efficiency or the amount of energy used may be displayed together with the list of the energy usage equipment at the energy controlling step.

According to an embodiment of the present disclosure, the energy usage equipment may be electrical equipment, and an equipment control signal to control the energy usage equipment may be directly transmitted to the energy usage equipment or to an equipment controller to integrally control the energy usage equipment.

According to the present disclosure, an alarm can be generated when the total energy usage rate consumed at an energy consumption place during a certain period exceed an upper limit value (target) that is assigned by a user.

Since various kinds of mobile terminals such as mobile phone, iPhone and notebook computer are always carried by a user, when an energy usage rate exceeds an upper limit by an increased amount of energy used or a changed energy price, the user can identify it even though he or she is not positioned in an energy consumption place.

When an alarm is generated in a mobile terminal, a user can selectively and remotely control energy consumption equipment positioned in an energy consumption place using the mobile terminal so that the total rate of energy used can be maintained below a fixed level.

That is, even though all of members of an energy consumption place are out of the energy consumption place due to the reasons such as going out, traveling and working, it is possible to control an energy usage state of an energy consumption place.

Accordingly, a user can control energy usage more actively, and use limited energy resources more efficiently to meet the trend of modern society to which an energy price change system and a smart grid technology are applied.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings:

FIG. 1 shows an embodiment of an energy control system according to the present disclosure;

FIG. 2 shows an example of information that a user information database of a central server holds;

FIG. 5 shows an example of an energy price structure;

FIGS. 10 and 11 show an example in which an energy control unit controls energy usage equipment directly and individually;

DETAILED DESCRIPTION OF THE PREFERRED EMBODIMENTS

Figure 3:
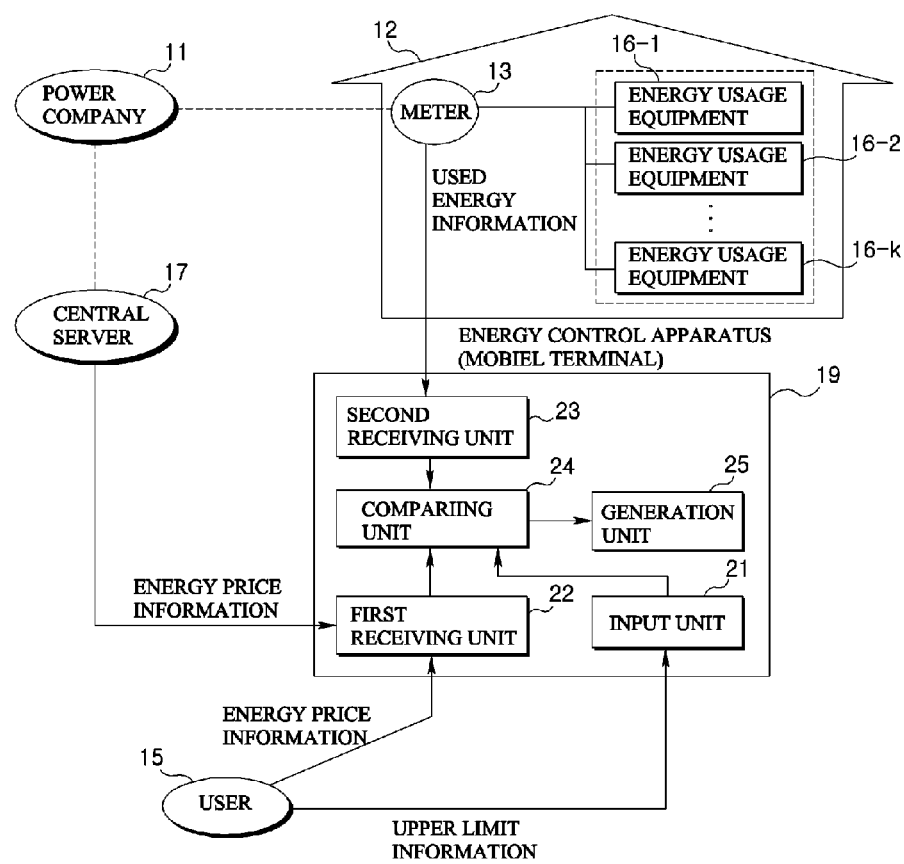
FIG. 3 shows a first embodiment of an energy control apparatus according to the present disclosure.

Hereinafter, a preferred embodiment of the present disclosure will be described with reference to the accompanying drawings.

Energy used in the present disclosure refers to any one of electricity, gas and water supply, if not mentioned otherwise.

FIG. 1 shows an embodiment of an energy control system according to the present disclosure, in which a central server 17 and a user mobile terminal 19 are linked so that when the total rate of energy used that is consumed in the energy consumption place such as home, office and company exceeds an upper limit set in advance, the energy control system informs the user of it by generating an alarm.

The central server 17 is a server used to provide energy related services, and a price transmission unit 17-3 provides energy price information stored in an energy price database 17-1 through various communication networks such as wireless mesh, power line communication network, and Internet network.

The central server 17 can provide a service that an alarm message is transferred to a user mobile terminal 19 according to an energy usage state in an energy consumption place 12, and to do this, a user information database 17-2 can maintain upper limit value information of total rate of energy used, meter identification information and mobile terminal number that are set by each user.

A meter 13 is installed in the energy consumption place 12 such as home, office and company in which energy is used.

The meter 13 is an apparatus to detect energy usage information, which is an electronic meter to measure a state that energy provided from an energy providing company 11 is used in each of energy usage equipment 16-1 to 16-$k$ of energy consumption place 12. A detailed example of the meter 13 is a smart meter.

In accordance of the present disclosure, the meter 13 transmits information on the amount of energy used to the mobile terminal 19 or the central server 17.

The information on the amount of energy used that is transmitted by the meter 13 becomes a base to calculate the total rate of energy used that is used by the user in the mobile terminal 19 or the central server 17 during a certain period, and the meter 13 transmits the information on the amount of energy used in order to identify the change of the energy price since the energy price can be changed.

For example, when the energy price is fixed, the only consideration is the current amount of energy used.

However, when the energy price is changed depending on the time of day, the information on the amount of energy used is transmitted each time section, or time information is transmitted together with the information on the amount of energy used in order to identify the changed amount of energy used at the time section.

A data structure used when the meter 13 transmits the information on the amount of energy used can be variously constructed to transfer the information on the amount of energy used correctly, and include meter identification information to identify the meter.

The user mobile terminal 19 is a mobile terminal such as mobile phone, iPhone and notebook computer, which can have various communication functions such as communication through a mobile communication network or local area wireless communication.

An energy control system according to the present disclosure is constructed of an input unit 21, a first receiving unit 22, a second receiving unit 23, a comparing unit 24 and a generation unit 25.

Here, the input unit 21, the second receiving unit 23, the comparing unit 24 and the generation unit 25 are components that can be embodied in the central server 17 or the mobile terminal 19, and the first receiving unit 22 is a component that can be embodied in the mobile terminal 19.

The first receiving unit 22 is embodied in the mobile terminal 19, serving to receive the energy price information from the central server 17. The first receiving unit 22 may be constructed in such a manner that the user 15 can directly input the energy price information.

The input unit 21 serves to receive information on the upper limit of total rate of energy used during a certain period from the user 15, and the second receiving unit 23 serves to receive information on the amount of energy used from the meter 13.

The comparing unit 24 calculates the total rate of energy used during a certain period using the information on the amount of energy used and the information on the energy price that are input through the second receiving unit 23, and compares it with the upper limit input through the input unit 21.

Here, the fixed period can have a variety of meanings.

For a detailed example, the fixed period can mean a period from the first day of each month to current time in consideration of the period unit (for example, one month) for which an energy supply company 11 charges the user 15 for the energy used.

In this case, the comparing unit 24 examines if the total rate of energy used from the first day of each month to current time exceeds the upper limit.

The generation unit 25 enables the mobile terminal 19 of the user to generate an alarm when the total rate of energy used in an energy consumption place during a certain period exceeds the upper limit input through the input unit 21 as a result of comparison in the comparing unit 24.

The energy control system may be constructed by further comprising an energy control unit 26 with which the user can control the energy usage equipment 16-1 to 16-*k* of the energy consumption place 12.

The energy control unit 26 is a component that is embodied in the mobile terminal 19, which enables a display screen of the mobile terminal 19 to display a list of the energy usage equipment so that the user can select energy usage equipment to be controlled. At this time, the energy control unit 26 can also display information on characteristics of the energy usage equipment in order to help the user select the energy usage equipment to be controlled.

The energy control unit 26 can directly transmit equipment control signals to control the energy usage equipment 16-1 to 16-*k* to the energy usage equipment.

If the energy usage equipment 16-1 to 16-*k* are integrated all together through the equipment controller, the energy control unit 26 can transmit the equipment control signals to control the energy usage equipment to the equipment controller.

Figure 8:
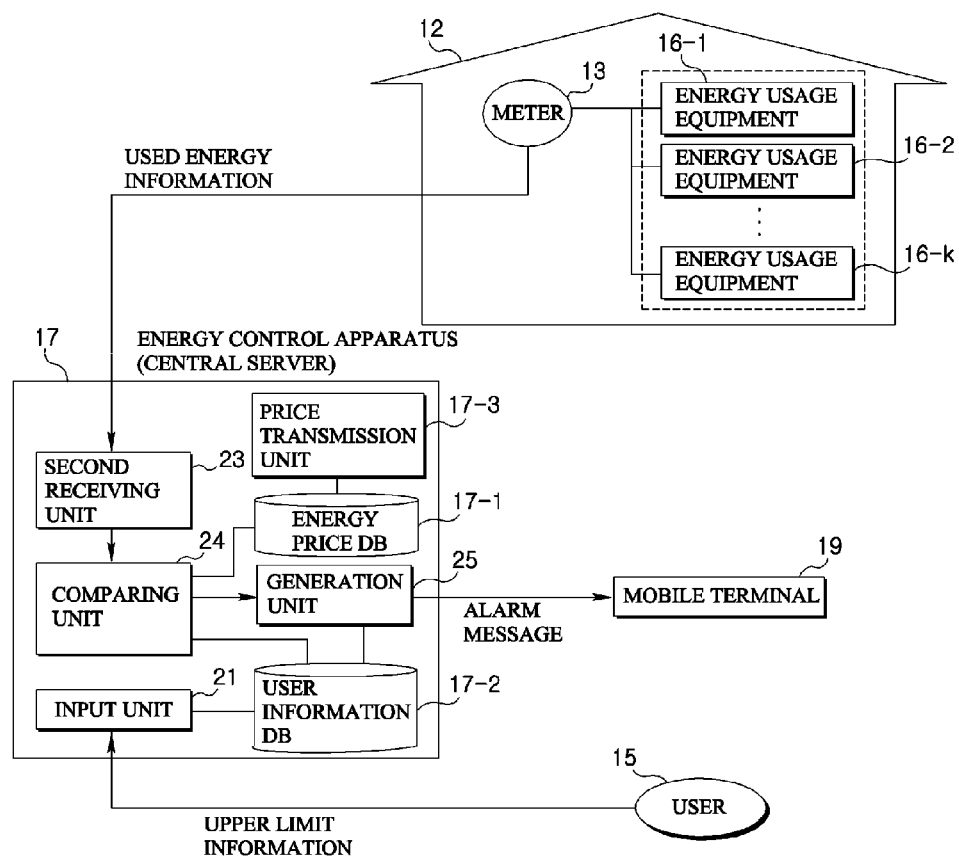
FIG. 8 shows a second embodiment of an energy control apparatus according to the present disclosure.

Since the input unit 21, the first receiving unit 22, the second receiving unit 23, the comparing unit 24, the generating unit 25 and the energy control unit 26 are identical to those of an energy control apparatus to be described with reference to FIG. 3 or FIG. 8, their detailed description will be given in a portion related with the energy control apparatus below.

Referring to FIG. 3, a first embodiment of the energy control apparatus 19 according to the present disclosure is constructed as a form of a mobile terminal At this time, the mobile terminal may be a mobile terminal such as mobile phone, iPhone and notebook computer, which can be used other than energy control, and may be a terminal that can be specifically manufactured to be operated as an energy control apparatus as needed.

Therefore, though the energy control apparatus 19 in FIG. 3 shows only components related with the present disclosure, it can include various components to perform other functions of the mobile terminal For example, when the energy control apparatus 19 is a mobile phone, various components may be included, which serve as a mobile phone through a mobile communication network interface such as CDMA (Code Division Multiple Access) or WCDMA (Wideband CDMA).

The input unit 21 provides a user interface UI which enables the user 15 to input information on the upper limit of the total rate of energy used, and stores the information on the total rate of energy used that is input by the user 15.

The user interface which enables the user to input the information on the upper limit of the total rate of energy used, can be constructed variously.

Figure 4:
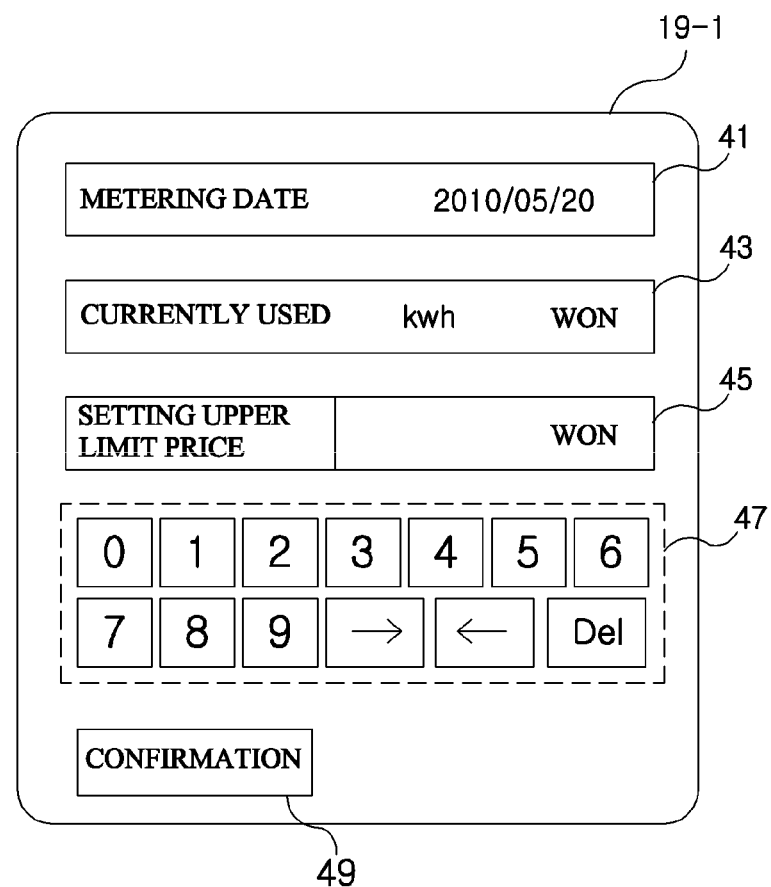
FIG. 4 shows an example of a user interface screen used to set an upper limit.

FIG. 4 shows an example of a display screen 19-1 of an energy control apparatus, wherein a user inputs an upper limit value into a portion 45 where information on the upper limit of the total rate of energy used is input using a key button 47 including a numeral key, a moving key, and a delete key, and finishes to input the information on the upper limit by touching the identification key 49.

The user can access to such a user interface through a menu provided by the energy control apparatus 19, and then various kinds of energy related information such as metering date information 41, information on current total amount of energy used and the total rate of energy used 43 may be displayed, which can be helpful for the user.

The first receiving unit 22 serves to receive energy price information from the central server 17, and the energy price information may be provided in advance or provided in real time.

The energy price may have a variety of structures.

If the energy price is fixed, the energy price information may have simple structures such as Won/KWh, Won/KVarh and Won/KVAh.

However, the energy price can be changed according to the amount of energy used or time of energy used, for example, Progressive Pricing, Time of Use Pricing, Critical Peak Pricing, and Real-Time Pricing.

The following Table 1 shows a Progressive Pricing in which unit price becomes high as the amount of energy used increases when the energy is electricity.

TABLE 1

|  | First section | Second section | Third section | Fourth section | ... |
|---|---|---|---|---|---|
| Section scope | −100 | 101-200 | 201-300 | 301-400 | ... |
| Unit price (Won/Kwh) | 55.10 | 113.80 | 168.30 | 248.60 | ... |

FIG. 5A shows Time of Use Pricing (TOU) that is usually used in shopping area, factory and large building, where the price of electricity is different depending on the time of day. FIG. 5B shows Critical Peak Pricing (CPP), where the price of electricity is different depending on the time of day, and the price is especially high at the peak section. FIG. 5C shows Real-Time Pricing (RTP), where the price of electricity changes in a real-time.

Further, the first receiving unit 22 can be constructed such that the user 15 can directly input energy price information.

That is, an energy supply company 11 can inform the user of energy price information through facsimile machine, text message and telephone, or the user can identify the energy price information when it is announced on an Internet web site.

At this time, the first receiving unit 22 can provide a user interface UI which enables the user 15 to input the energy price information.

The second receiving unit 23 serves to receive the information on the amount of energy used that the meter 13 periodically transmits.

The communication interface with which the second receiving unit 23 and meter 13 can exchange the information on the amount of energy used with each other, can be constructed variously.

For example, they can exchange the information on the amount of energy used with each other using a local area wireless network when a local area network is available in the energy control apparatus 19, and through a mobile communication network interface such as CDMA or WCDMA when the energy control apparatus 19 is a mobile phone.

The comparing unit 24 compares the total rate of energy used in each of energy usage equipment 16-1 to 16-k of the energy consumption place 12 during a certain period with the upper limit of the total rate of energy used that is input through the input unit 21.

Figure 6:
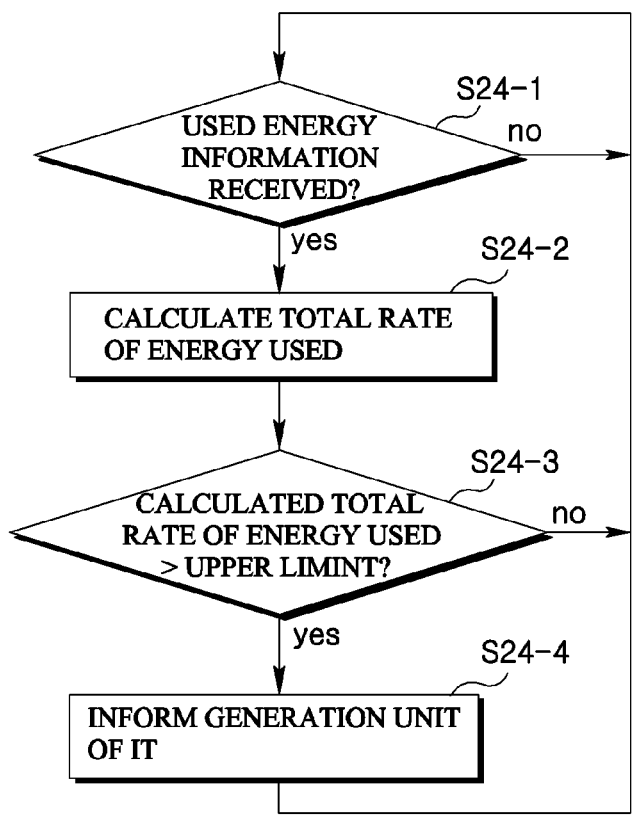
FIG. 6 is a flow chart illustrating an operation procedure of a comparing unit.

Referring to FIG. 6, when the comparing unit 24 receives the information on the amount of energy used from the meter 13 through the second receiving unit 23 (S24-1), it calculates the total rate of energy used using the received information on the amount of energy used and energy price information (S24-2), and examines whether the calculated total rate of energy used exceeds the upper limit of the total rate of energy used that is input through the input unit 21 (S24-3). Further, when exceeded the upper limit as a result of examination at Step 24-3, it is informed to the generation unit 25 (S24-4).

When the energy price is fixed, the comparing unit 24 can easily calculate the total rate of energy by multiplying the amount of energy used by the energy price at Step S24-2.

For example, under the assumption that the energy is electricity, when the amount of energy used is 210 Kwh, and the energy price is 100 Won/Kwh, the total rate of energy used can be calculated in '210×100 Won'.

However, when the energy price is changed depending on the amount of energy or the time of day, such as Progressive Pricing, Time of Use Pricing, Critical Peak Pricing and Real-Time Pricing, such energy price structure should be reflected.

As a method for this, the comparing unit 24 identifies the changed amount of energy used dQ in an interval that can reflect the change of energy price, for example, each hour, and sums values produced by multiplying each dQ by the energy price in each time section so that it can calculate the total rate of energy used. That is, when the energy price is changed, the total rate of energy used MT can be calculated according to the following mathematical expression 1.

$$MT = \overset{n}{\underset{i=1}{Q}}(P_i S dQ_i) \quad \text{[expression 1]}$$

Here, i denotes each time section from a starting point in a predetermined period, Pi denotes an energy price in a relevant time section i, and dQi denotes the changed amount of energy used in the relevant time section i.

At this time, information on the dQi corresponding to each time section and the calculated rate of energy used can be stored and maintained as a Load Profile, and can be provided as user energy usage information in each time section by the energy control apparatus 19.

While the total rate of energy used can be calculated by simply multiplying the amount of energy used by the energy price, the rate that the user will actually pay can be determined in more complicated manner. Further, since the user is mainly interested in the rate that he or she should actually pay, 'the total rate of energy used' is treated to mean the amount that will be actually charged to the user.

When the energy is electricity, the rate charging policy of the energy supply company 11 may include information on basic rate, tax, power-factor rate, and rate profit.

The tax may include value-added tax and various kinds of funds. The rate profit means that electric rate is cheaply set for a specific industry such as a knowledge service industry, compared with other industry, for example.

A detailed example to calculate rate to be actually charged to a user when energy price information is based on the Progressive Pricing as illustrated in the following Table 2 will be described.

TABLE 2

|  | First section | Second section | Third section | Fourth section | ... |
|---|---|---|---|---|---|
| Section scope | −100 | 101-200 | 201-300 | 301-400 | ... |
| Unit price (Won/Kwh) | 55.10 | 113.80 | 168.30 | 248.60 | ... |
| Basic rate (Won) | 370 | 820 | 1,430 | 3,420 | ... |

It is assumed that the rate to be asked to the user is 'electric rate+added rate', the electric rate is 'the amount of power used×unit price+basic rate', the added rate is 'power industry based fund+value-added tax', the power industry based fund is 3.7% of the electric rate, and the value-added tax is 10% of the electric rate.

It is assumed that current date is May 20, 2010, and the total amount of electricity used is 230 Kwh.

Then, the electric rate becomes 23,369 Won (calculated as '100×55.1+100×113.8+30×168.3+1,430), and the last item 1,430 Won is a basic rate. The added rate 3,202 Won (calculated as '23,369×0.037+23,369×0.1'), and accordingly the rate to be actually asked to the user is 26,571 Won.

When the current total rate of the energy used exceeded the upper limit as a result of the comparison in the comparing unit 24, the generation unit 25 generates alarm so that the user knows it.

Figure 7:
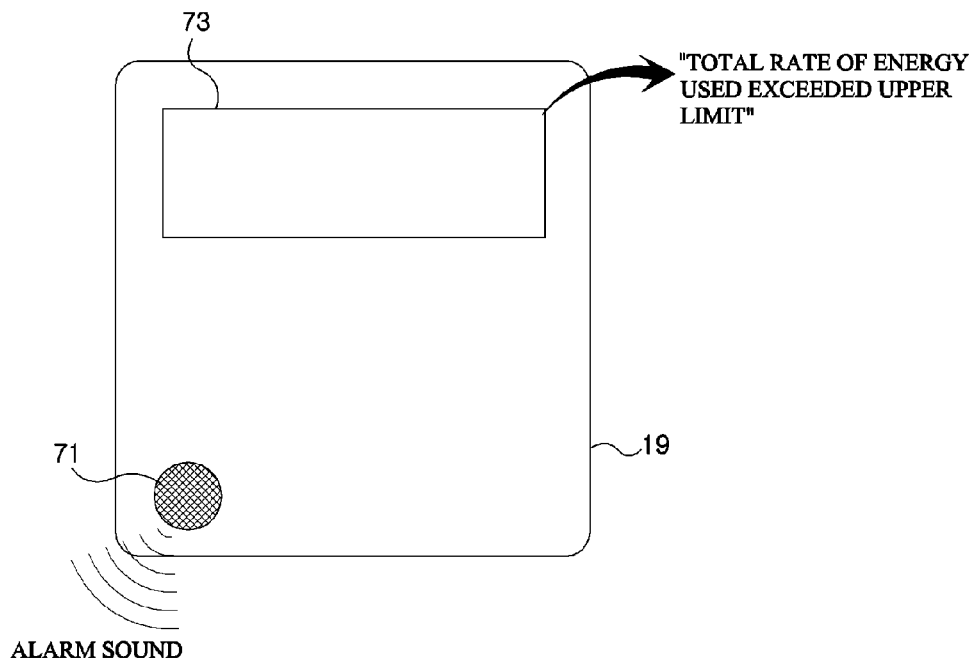
FIG. 7 is a summary to explain a mobile terminal that outputs an alarm.

The method that the generation unit 25 generates the alarm can be constructed variously, wherein an alarm sound can be output from a speaker 71 or an alarm message can be output on a display screen 73, as shown in FIG. 7.

Figure 9:
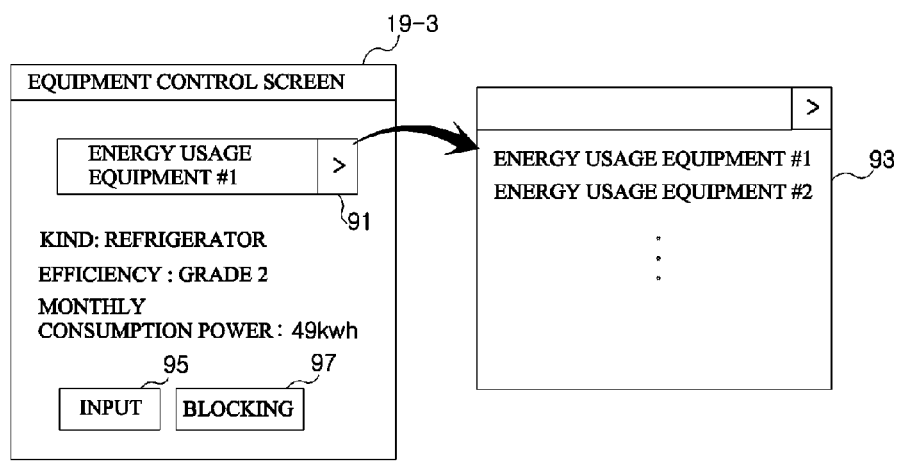
FIG. 9 shows an example of a user interface screen that an energy control unit provides.

Referring to FIG. 9, a second embodiment of the energy control apparatus 17 according to the present disclosure is constructed using a central server.

A price transmission unit 17-3 of the central server 17 provides energy price information stored in an energy price database 17-1 through various communication networks such as wireless mesh, power line communication network and Internet network.

A user information database 17-2 maintains information used to make the central server serve as an energy control apparatus, for example, information on the upper limit value of the total rate of energy used for each user, meter identification information and mobile terminal number.

The input unit 21 interfaces to the user in order that the user can input information on the upper limit of the total rate of energy used, and stores the information on the upper limit input by the user 15 in the user information database 17-2.

The user interface used to enable the user 15 to input the information on the upper limit of the total rate of energy used, can be constructed variously.

The user interface may include a scheme in which the input unit 21 interfaces to the user 15, for example, a call center in which an advisor identifies the information on the upper limit through a call phone, an automatic response service ARS in which the information on the upper limit is input through a voice guidance based on a scenario set in advance, an Internet website in which the information on the upper limit is input on a web through Internet home page.

The second receiving unit 23 receives information on the amount of energy used in each energy consumption place from the meter 13 through various communication networks such as wireless mesh, power line communication network and Internet network.

At this time, the meter 13 transmits the information on the amount of energy used together with meter identification information in order to identify for what user the information on the amount of energy used is related. The meter identification information can be constructed variously, including a unique identification number given to each meter 13, for example.

The comparing unit 24 compares the total rate of energy used in each energy usage equipment 16-1 to 16-$k$ during a certain period with the upper limit of the total rate of energy used that is input through the input unit 21.

That is, when the information on the amount of energy used is received from the meter 13 through the second receiving unit 23, the comparing unit 24 calculates the total rate of energy used using the information on the amount of energy used and the energy price information received, and identifies whether the calculated total rate of energy used exceeds the upper limit that is input through the input unit 21 by comparing them. Then, when exceeded the upper limit as a result of the comparison, it is informed to the generation unit 25.

When the current total rate of energy used exceeds the upper limit as a result of the comparison in the comparing unit 24, the generation unit 25 checks the user information database 17-2 and transmits an alarm message to the mobile terminal 19 of the relevant user. Accordingly, the mobile terminal 19 of the user outputs an alarm message on the display screen.

Meanwhile, the energy control apparatus 19 of the first embodiment according to the present disclosure can be constructed by further including an energy control unit 26 with which the user can selectively control operations of the energy usage equipment.

That is, the energy control unit 26 enables the user to control each OF energy usage equipment in the energy consumption place using a mobile terminal For this, the energy control unit 26 displays a list of the energy usage equipment on the display screen so that the user can select the energy usage equipment to be controlled, and transmits energy input instruction or energy blocking instruction for the selected energy usage equipment made by the user as an equipment control signal.

The energy control unit 26 can also display characteristic information of each of energy usage equipment such as the amount of energy consumption or energy efficiency in order to help the user select the energy usage equipment to be controlled.

Then, the user can select the target to be controlled more efficiently by preferentially blocking an energy supply to energy usage equipment that has poor energy efficiency with reference to such characteristic information.

FIG. 9 shows an example of a user interface screen 19-3 provided by the energy control unit 26.

The user can show a selection window 93 to be controlled using a drop button 91, and select energy usage equipment to be controlled among a list of energy usage equipment that is listed on the selection window 93 to be controlled.

Information on kind, energy efficiency and monthly power consumption of currently selected energy usage equipment is displayed together with the energy usage equipment to be controlled as characteristic information.

The user can make energy supply or blocking instruction to the energy usage equipment selected currently using an input button 95 or a blocking button 97, and the energy control unit 26 transmits equipment control signals to control the relevant energy usage equipment according to the user instruction.

FIG. 9 is only an explanatory example for better understanding, and there is no doubt that a user interface provided by the energy control unit 26 can be constructed variously.

Referring to FIGS. 10 to 13, a detailed example to control the energy usage equipment will be described.

Figure 10:
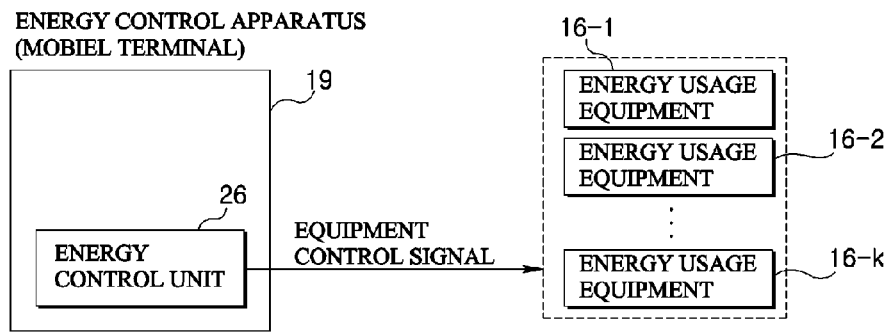

Referring to FIG. 10, the energy control unit 26 can directly transmit equipment control signals to control the energy usage equipment to the energy usage equipment.

At this time, the energy usage equipment 16-1 to 16-$k$ should be constructed in such a manner that they receive equipment control signals transmitted by the energy control unit 26 so as to turn on/off the power, or they receive equipment control signals from a consent stage connected to a power plug so as to turn on/off the power source.

Referring to FIG. 11A, the energy usage equipment includes a contact point 111-3, a contact point driver 111-2 and a communication unit 111-1.

When the energy control unit 26 transmits the equipment control signals for the energy usage equipment 16-1, the communication unit 111-1 of the energy usage equipment 16-1 receives the equipment control signals transmitted by the energy control unit 26.

The communication unit 111-1 transfers the received equipment control signals to the contact point driver 111-2, and the contact point driver 111-2 connects or opens the contact point 111-3 for the power source of the energy usage equipment 16-1.

FIG. 11B shows an example to control a third device 205 (referred to as a power source switch device, hereinafter), wherein a power source plug 206 of the energy usage equipment 16-1 is connected to the power source consent 204 through the power source switch device 205.

The power source switch device 205 can be constructed to have connecting pins 205-1 and 205-2 that can be attached to or detached from connection holes 204-1 and 204-2 of the power source consent 204, and connection holes 205-3 and 205-4 to which the power source plug 206 of the energy usage equipment is connected.

When the energy control unit 26 transmits the equipment control signal for the energy usage equipment 16-1, a communication unit 205-7 of the power source switch apparatus 205 receives the equipment control signal transmitted from the energy control unit 26 and transfers it to the contact point driver 205-8, and the contract point driver 205-8 connects or opens the contact point 205-6 with respect to the energy usage equipment 16-1.

Figure 12:
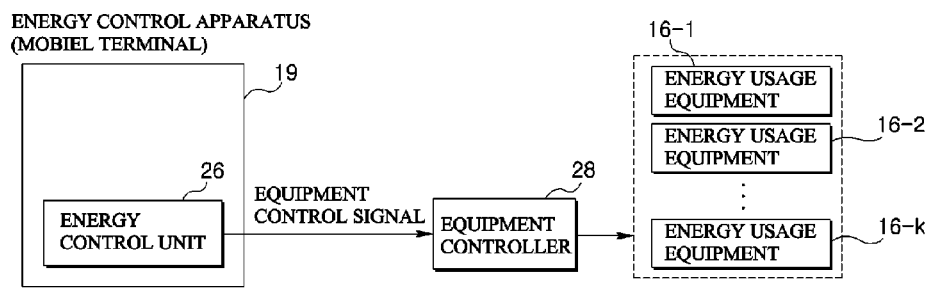
FIGS. 12 and 13 show an example in which an energy control unit controls energy usage equipment through a controller to control equipment.

Referring to FIG. 12, the energy control unit 26 can transmit the equipment control signal to control the energy usage equipment to the equipment controller 28 that integrally controls the energy usage equipment 16-1 to 16-$k$.

That is, when the energy usage equipment 16-1 to 16-$k$ of the energy consumption place are constructed to be integrally controlled through the equipment controller 28, the energy control unit 26 can transmit the equipment control signal to the equipment controller 28.

Figure 13:
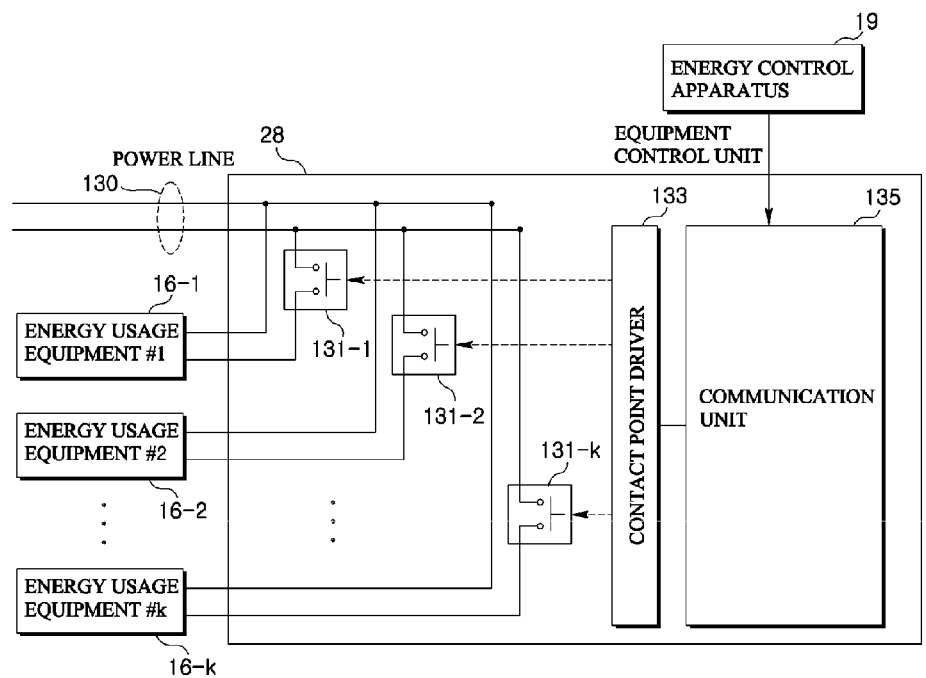

FIG. 13 shows an example in which the energy usage equipment 16-1 to 16-$k$ is integrally controlled through the equipment controller 28. While here is illustrated an example in which the equipment controller 28 controls a contact point of the power line 130 leading into the energy usage equipment 16-1 to 16-$k$, there is no doubt that the energy usage equipment can be integrally controlled by various wired/wireless local area communication methods as well as the contact point control.

The equipment controller 28 includes contact points 131-1 to 131-$k$ that connect or open the power line 130 correspondingly to each of the energy usage equipment, the contract point driver 133 and the communication unit 135.

The communication unit 135 receives the equipment control signal transmitted from the energy control unit 26 and transfers it to the contact point driver 133, and the contract point driver 133 accordingly connects or opens the relevant contact point so that it controls whether power should be supplied to each of the energy usage equipment or not.

Figure 14:
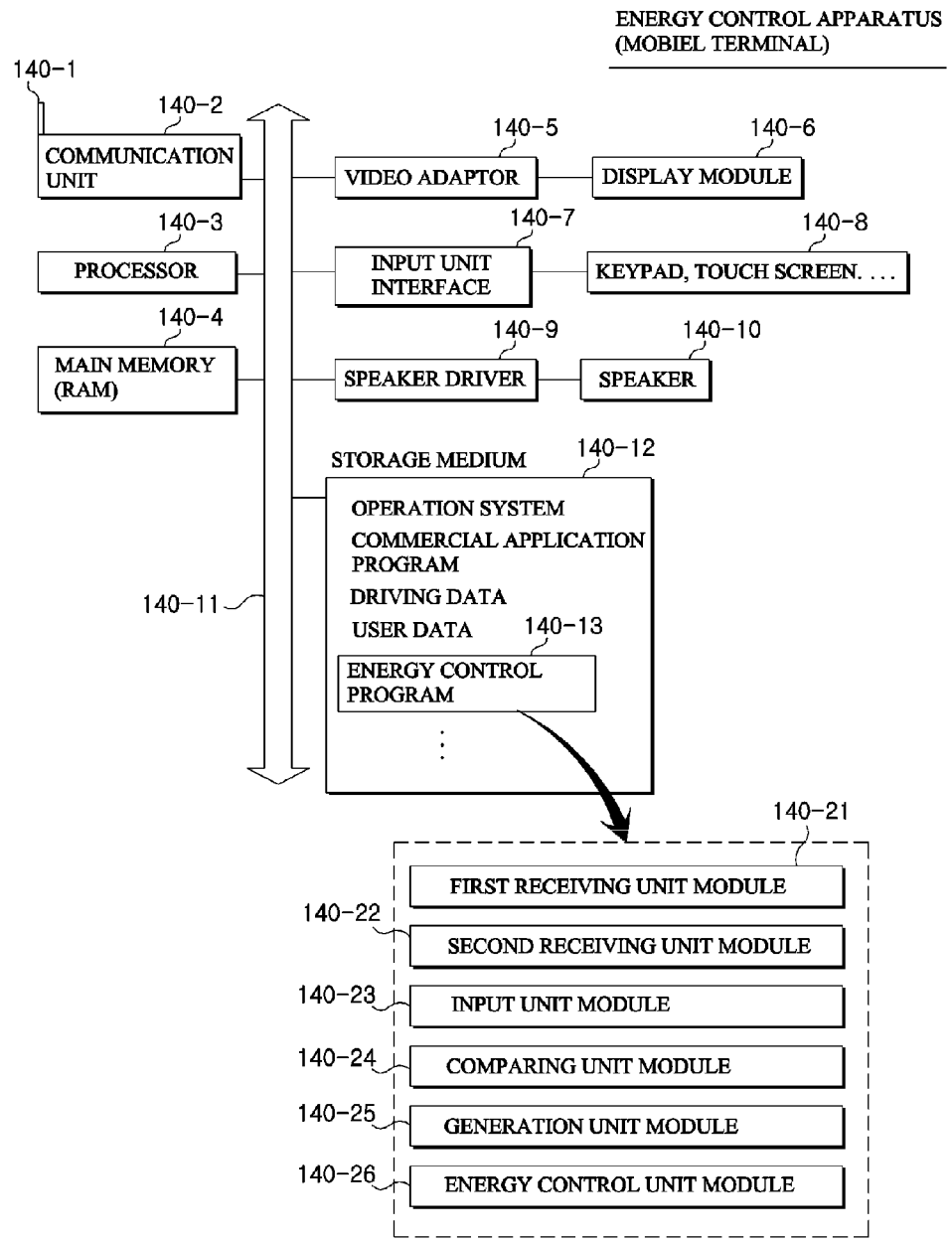
FIG. 14 shows a detailed example that constructs a first embodiment of an energy control apparatus.

Referring to FIG. 14, a detailed embodiment for the energy control apparatus 19 of the first embodiment constructed in a form of a mobile terminal will be described.

A processor 140-3 can be constructed of a central processing unit CPU or a microprocessor, which generally controls an energy control apparatus 19 while transmitting and receiving information to and from each element through a system bus which can have various structures.

The communication unit 140-2 serves to communicate through an antenna 140-1 and can have communication interface structures that can be constructed in various schemes.

For example, when the energy control apparatus 19 is a mobile phone, it can be interfaced to the mobile communication network in the CDMA or WCDMA scheme.

A RAM 140-4 which is a main memory temporarily stores computer program or data to which the processor 140-3 accesses immediately.

A video adaptor 140-5 visually outputs an operation state of the energy control apparatus 19 and information to be suggested to the user through the display module 140-6, and the display module 140-6 can have various forms and structures such as LCD (Liquid Crystal Display) and LED (Light Emitting Diode).

The input apparatus interface 140-7 enables the user to input information or instruction on the operation of the energy control apparatus 19 using various input apparatus 140-8 such as keypad and touch screen, and the speaker driver 140-9 serves to drive the speaker 140-10.

The storage medium 140-12 stores various kinds of computer programs such as OS (Operating System) and wireless Internet browser and information such as driving data and user data, and especially maintains an energy control program 140-13 that can perform an energy control related function.

While a role of the storage medium 140-12 may be performed by the ROM, it should have a property of non-volatility with which digital data can be read and written in order to store or cancel information frequently and store information that should be kept regardless of power supply. The storage medium can have various structures and performances such as embedded type, external type, separable type and non-separable type, according to the need.

The energy controlling program 140-13 stored in the storage medium 140-12 can be constructed variously, which at least includes a program module 140-21 that enables the mobile terminal to perform a role of the first receiving unit, a program module 140-21 that enables the mobile terminal to perform a role of the second receiving unit, a program module 140-23 that enables the mobile terminal to perform a role of an input unit, a program module 140-24 that enables the mobile terminal to perform a role of the comparing unit, and a program module 140-25 that enables the mobile terminal to perform a role of the generation unit.

Further, the energy controlling program may further include a program module 140-26 that enables the mobile terminal to perform a role of the energy control unit.

Each of the program modules 140-21 to 140-26 of the energy controlling program 140-13 is loaded on the main memory 140-4 and executed by the processor 140-3, so that the mobile terminal can perform its function.

FIG. 14 is only an explanatory example for better understanding and the energy control apparatus 19 according to the present disclosure can be variously constructed according to the need.

Figure 15:
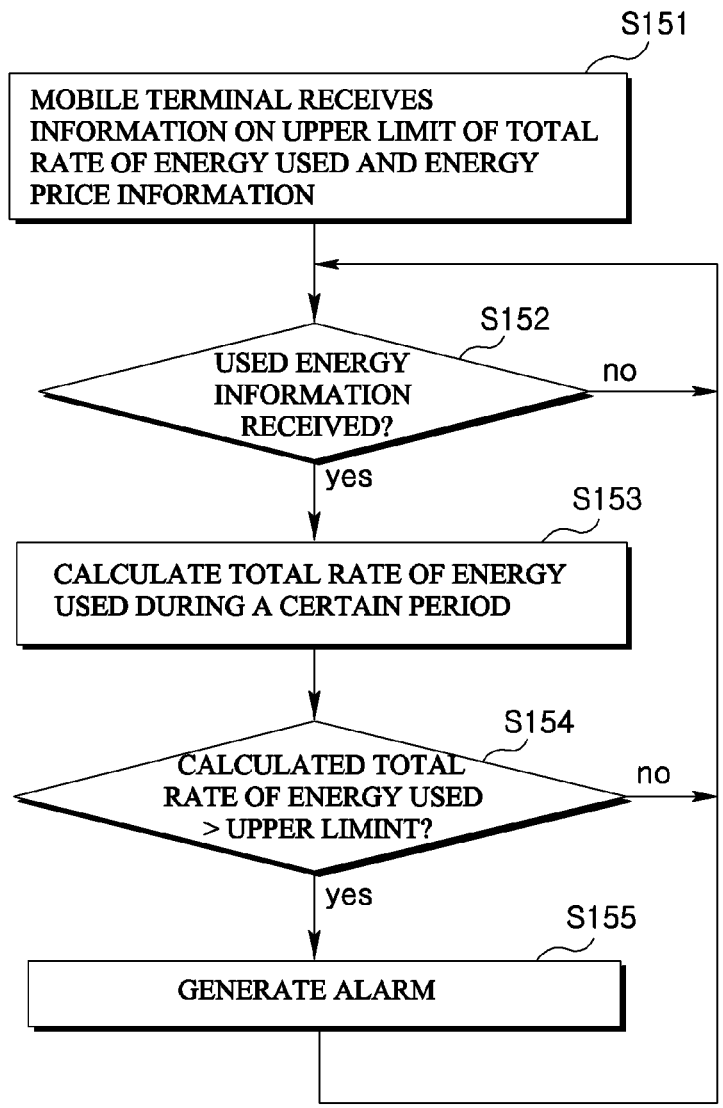
FIGS. 15 to 17 are flow charts illustrating each embodiment of an energy control method according to the present disclosure.
Figure 16:
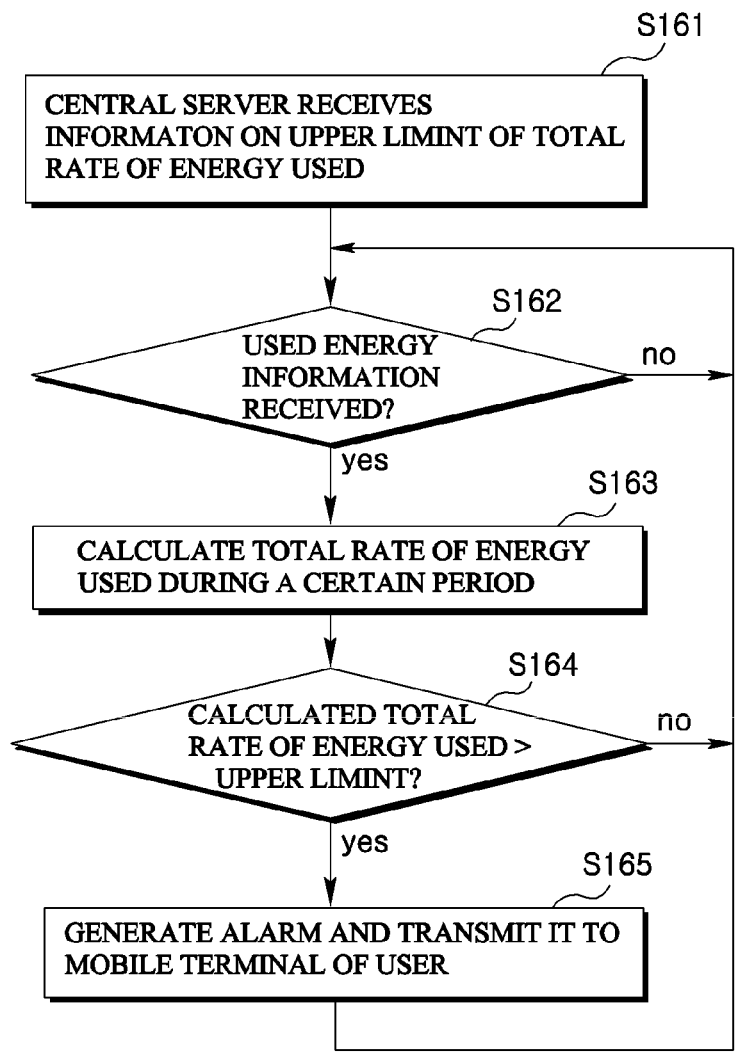
Figure 17:
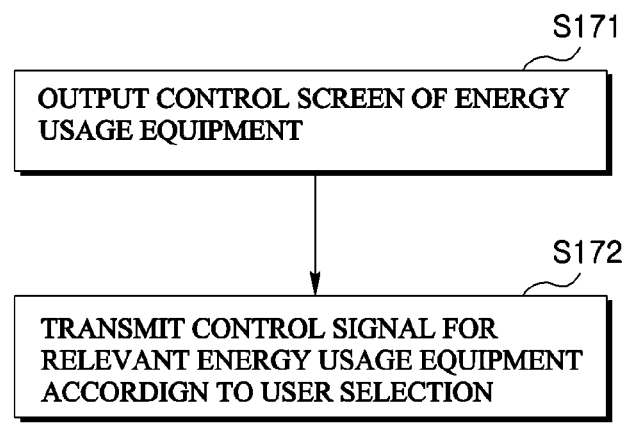

Referring to FIGS. 15 to 17, each embodiment of the energy control method according to the present disclosure will be described.

FIG. 15 is a flow chart of a first embodiment illustrating an energy control method that is performed through a mobile terminal, FIG. 16 is a flow chart of a second embodiment illustrating an energy control method that is performed through a central server and FIG. 17 is a flow chart illustrating procedures to control each of the energy usage equipment of an energy consumption place through a mobile terminal.

A first embodiment of an energy control method according to the present disclosure will be described with reference to FIG. 15.

First, the mobile receives information on the upper limit of the total rate of energy used and energy price information (S151).

The mobile terminal can provide a variety of user interfaces UI, and especially provides a user interface with which the user can input the information on the upper limit of the total rate of energy used at Step 151.

Energy price can have various structures that change according to the amount or time of energy used, for example, Progressive Pricing, Time of Use Pricing, Critical Peak Pricing, and Real-Time Pricing.

The energy price information can be constructed to receive it from the central server or to input it directly by the user. When the user directly input the energy price, the mobile terminal can provide a user interface which enables the user to input the energy price information.

Meanwhile, the mobile terminal periodically receives information on the amount of energy used in each of the energy usage equipment from the energy consumption place. When the information on the amount of energy used is received (S152), the total rate of energy used during a certain period is calculated using the received information on the amount of energy used and energy price information (S153).

The meter may be a smart meter. The mobile terminal and meter can exchange the information on the amount of energy used with each other through various communication interfaces such as a local area wireless communication interface and a mobile communication network interface, for example, CDMA and WCDMA.

When the energy price is fixed, the total rate of energy used can be easily calculated by multiplying the received amount of energy used by the energy price at Step 153.

However, when the energy price changes depending on the amount of energy used or the time of day such as Progressive Pricing, Time of Use Pricing, Critical Peak Pricing, and Real-Time Pricing, such energy price structures should be reflected on.

For this, the total rate of energy used can be calculated by producing the rate of energy used in a unit of time section which can reflect the change of energy price as described in the mathematical expression 1 and summing them.

Further, 'the total rate of energy used' can be treated to have a meaning of the amount to be actually asked to a user.

When the total rate of energy used during a certain period is calculated at Step 153, the mobile terminal compares the total rate of energy used that is calculated at Step 153 and the upper limit that is input at Step 151 (Step 154).

Further, when exceeded the upper limit as a result of comparison at Step 154, an alarm is generated so as to inform the user of it (Step 155).

A method of generating an alarm at Step 155 can be variously constructed, wherein an alarm sound is output using a speaker included in the mobile terminal as described with reference to FIG. 7 so as to inform the user of it, or an alarm message is output on the display screen of the mobile terminal.

A second embodiment of the energy control method according to the present disclosure will be described with reference to FIG. 16.

First, the central server receives information on the upper limit of the total rate of energy used from the user (S161).

At Step 161, the central server can receive the information on the upper limit by interfacing to the user in a variety of methods. For example, there are a call center in which an advisor identifies the information on the upper limit through a call phone, an automatic response service ARS in which the information on the upper limit is input through a voice guidance based on a scenario set in advance, an Internet website in which the information on the upper limit is input on a web.

Meanwhile, the central server periodically receives the information on the amount of energy used in each of the energy usage equipment from the meter of the energy consumption place. At this time, when the information on the amount of energy used is received (S162), the total rate of energy used is calculated using the received information on the amount of energy used and the energy price information (S163).

The meter may be a smart meter. The central server and the meter can exchange the information on the amount of energy used with each other through various communication interfaces such as wireless mesh, power line communication network, Internet network and mobile communication network.

Since a method of calculating the total rate of energy used at Step 163 is identical to the description given at Step 153 in FIG. 15, an overlapped description will be omitted Here, 'the total rate of energy used' is treated to have a meaning of the amount to be actually asked to the user.

Now, the central server compares the total rate of energy used calculated at S163 and the upper limit input at S161 (S164).

When the total rate of energy used exceeded the upper limit as a result of comparison at Step 164, the central server transmits an alarm message to the mobile terminal of the user so as to inform the user of it (S165).

Then, the mobile terminal of the user outputs an alarm message on the display screen or generates an alarm sound.

The first and second embodiments of the energy control method according to the present disclosure may be constructed to further include an energy control step in which the user can selectively control operations of the energy usage equipment using a mobile terminal.

Referring to FIG. 17, the mobile terminal outputs a user interface screen on which the user can control the energy usage equipment at the energy control step (S171), and the equipment control signals with respect to the energy usage equipment are transmitted as the user makes directions on the user interface screen (S172).

The user interface screen is constructed in such a manner that the user can select the energy usage equipment to be controlled and can make an energy input instruction or an energy blocking instruction with respect to the selected energy usage equipment.

The user interface screen can display characteristic information in each of energy usage equipment such as the amount of energy used or energy efficiency in order to help the user to select the energy usage equipment to be controlled.

Then, the user can efficiently select the energy usage equipment to be controlled by preferentially blocking energy supply with respect to the energy usage equipment that has poor energy efficiency with reference to such characteristic information.

At the energy controlling step, the mobile terminal can directly transmit the equipment control signal to control the energy usage equipment to the energy usage equipment, like the example described with reference to FIGS. 10 and 11.

At this time, each of the energy usage equipment should be constructed to receive the equipment control signal transmitted by the energy control apparatus so as to turn on/off its own power supply, or to receive the equipment control signal from the consent stage connected to the power supply plug so as to turn on/off the power supply.

Further, at the energy control step, the mobile terminal can transmit the equipment control signal to control the energy usage equipment to the equipment controller that integrally controls the energy usage equipment as described with reference to FIGS. 12 and 13. That is, when each of the energy usage equipment in the energy consumption place is constructed to be integrally controlled through the equipment controller, the mobile terminal can transmit the equipment control signal to the equipment controller.

Hereinbefore, while the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

What is claimed is:

1. An energy control apparatus utilizing a central server, the apparatus comprising:
    an input unit in the central server for receiving information related to an upper limit of total rate of energy used during a certain period, the information received from a user;
    an energy price database for providing energy price information stored in the central server;
    a receiving unit in the central server for receiving information related to an amount of energy used by the user and meter identification of the user, the meter identification received from a corresponding meter;
    a comparing unit in the central server for comparing a total rate of energy used during the certain period with the received information related to the upper limit;
    a generation unit in the central server for generating an alarm for the user's mobile terminal when the total rate of energy used during the certain period exceeds the upper limit; and
    an energy control unit in the user's mobile terminal for selecting energy usage equipment according to an energy supply or blocking instruction from the user when the alarm is received from the central server and for transmitting an equipment control signal to control the selected energy usage equipment according to the instruction,
    wherein the information related to the upper limit is received via:
    a call center in which the information related to the upper limit is identified through a live telephone call;
    an automatic response service (ARS) in which the information related to the upper limit is input through voice guidance according to a previously set scenario; or
    an Internet website via which the information related to the upper limit is input.

2. The energy control apparatus according to claim 1, wherein the energy control unit displays a list of the energy usage equipment in order to enable the user to select the energy usage equipment to be controlled.

3. The energy control apparatus according to claim 2, wherein the energy control unit displays characteristic information of the energy usage equipment together with the list of the energy usage equipment.

4. The energy control apparatus according to claim 1, wherein:
    the energy usage equipment is electrical equipment; and
    the energy control unit controls the operation of the electrical equipment by transmitting the equipment control signal to the electrical equipment.

5. The energy control apparatus according to claim 1, wherein:
    the energy usage equipment is electrical equipment; and
    the energy control unit controls the operation of the electrical equipment by transmitting equipment control signal to an equipment controller.

6. The energy control apparatus according to claim 1, wherein the energy is generated by electricity, gas or water.

7. The energy control apparatus according to claim 1, wherein the corresponding meter is a smart meter.

8. A energy control method utilizing a central server, the method comprising:
    receiving information related to an upper limit of total rate of energy used during a certain period, the information received in the central server from user;
    providing energy price information from an energy price database in the central server;
    receiving information in the central server, the information related to an amount of energy used by the user;
    receiving meter identification of the user in the central server from a corresponding meter;
    comparing a total rate of energy used during the certain period with the received information related to the upper limit in the central server;
    generating an alarm for the user's mobile terminal in the central server when the total rate of energy used during the certain period exceeds the upper limit;
    selecting energy usage equipment in an energy control unit in the user's mobile terminal according to an energy supply or blocking instruction from the user when the alarm is received from the central server; and
    transmitting an equipment control signal from the energy control unit to control the selected energy usage equipment according to the instruction,
    wherein the information related to the upper limit is received via:
    a call center in which the information related to the upper limit is identified through a live telephone call;
    an automatic response service (ARS) in which the information related to the upper limit is input through voice guidance according to a previously set scenario; or
    an Internet website via which the information related to the upper limit is input.

9. The energy control method according to claim 8, further comprising displaying a list of the energy usage equipment by the central server in order to enable the user to select the energy usage equipment to be controlled.

10. The energy control method according to claim 9, further comprising displaying characteristic information of the energy usage equipment together with the list of the energy usage equipment.

11. The energy control method according to claim 8, wherein the energy usage equipment is electrical equipment and further comprising controlling the operation of the energy using equipment by transmitting the equipment control signal to the energy usage equipment.

12. The energy control method according to claim 8, wherein the energy usage equipment is electrical equipment and further comprising controlling the operation of the electrical equipment by transmitting the equipment control signal to an equipment controller.

13. The energy control method according to claim 8, wherein the energy is generated by electricity, gas or water.

14. The energy control method according to claim 8, wherein the corresponding meter is a smart meter.

* * * * *